United States Patent [19]

White et al.

[11] 4,008,865
[45] Feb. 22, 1977

[54] VALVE FOR PNEUMATIC TUBE TRANSPORTING SYSTEM

[75] Inventors: Chester N. White, Moylan; John F. Lindsay, Wilmington, both of Pa.

[73] Assignee: Sun Oil Company of Pennsylvania, Philadelphia, Pa.

[22] Filed: Sept. 25, 1975

[21] Appl. No.: 616,738

[52] U.S. Cl. .................................. 243/6; 243/38; 302/24
[51] Int. Cl.² ........................................ B65G 51/04
[58] Field of Search ............... 243/3, 4, 6, 20, 23, 243/25, 28, 38, 1; 251/298, 303; 302/24

[56] References Cited

UNITED STATES PATENTS

| 279,574 | 6/1883 | Leaycraft | 243/23 |
|---|---|---|---|
| 1,660,293 | 2/1928 | Cowley | 243/23 |
| 1,753,987 | 4/1930 | Hohne | 243/6 |
| 1,926,565 | 9/1933 | Taisey | 243/38 |
| 2,784,922 | 3/1957 | Richert | 243/38 |
| 3,438,337 | 4/1969 | Edwards | 243/1 |
| 3,556,603 | 1/1971 | Liebenberg | 302/24 |
| 3,870,250 | 3/1975 | Teodorescu et al. | 243/6 |

FOREIGN PATENTS OR APPLICATIONS

| 1,006,345 | 4/1957 | Germany | 243/38 |
|---|---|---|---|
| 304,919 | 4/1955 | Switzerland | 243/38 |

*Primary Examiner*—Evon C. Blunk
*Assistant Examiner*—Jeffrey V. Nase
*Attorney, Agent, or Firm*—J. Edward Hess; Donald R. Johnson; William C. Roch

[57] ABSTRACT

An improved valve for separating and sealing adjacent pneumatic tube sections of a pneumatic tube delivery system. The valve includes a pair of flap seals positioned on opposite sides of the travel path of a carrier through the valve. Each flap seal is spring biased closed, and has a shock absorbing element positioned behind it such that when the flap seal is kicked open by a carrier, the spring bias and the shock absorber will absorb the momentum of the kicked open flap seal. An air inlet section in the valve is designed to minimize the intake of rain and snow and further to minimize the coasting distance experienced by a carrier traveling through the valve.

4 Claims, 4 Drawing Figures

VALVE FOR PNEUMATIC TUBE TRANSPORTING SYSTEM

BACKGROUND OF THE INVENTION

In large industrial plants such as petroleum refineries, pneumatic tube systems are sometimes used to transport small samples of plant streams or tanks to the laboratory for analysis. This system saves a significant amount of time over that required for regular scheduled sample pickup by truck. The sample, usually a liquid, is poured into a plastic bottle and the bottle is capped. The capped bottle is placed in a metal cylinder or carrier, and the carrier is then inserted in the pneumatic tube for transportation to the laboratory. These systems may operate under pressure or vacuum, although vacuum systems are more commonly used. In vacuum systems, a pump is used to draw air from the remote end of the tube to the end at the laboratory. Pressure drop in the tube results in a partial vacuum in the line. The flow of air through the tube propels the carrier to the laboratory at the end of the tube. Typical systems use tubes from four to six inches in diameter, and may be from a few hundred feet to over a mile in length.

The longer systems require several pumps to provide a more even air flow in the tube and to overcome the greater frictional effect of the longer tube. These multipump systems are divided into sections by normally closed valves to prevent two pumps from working against one another. Each pump has its own section of tubing. The valves may be motor operated slide valves or spring loaded flapper valves. Carriers move through the tube typically at speeds of from thirty to forty feet per second. In the case of the slide valve, when the carrier approaches the valve, it trips an electrical switch which activates a motor to open the valve, allowing the carrier to pass through. The valve then closes automatically. This valve system is relatively complicated, expensive, and requires more maintenance than the spring loaded valve. When spring loaded valves are used, the valve is held shut by a combination of pressures from the spring and the vacuum in the tube. The moving carrier strikes the valve flap with a very high impact force and kicks it open, being carried past the valve flap by its momentum. The valve then closes automatically.

Experience gained in a large petroleum refinery from several years operation of a pneumatic tube system employing flapper valves indicates that proper valve design is an important factor in obtaining reliable operation. Commercially available flapper valves are supplied with a single springloaded flap which is faced with leather or rigid laminated canvas. These valves have been unsatisfactory for several reasons, and their use has lead to excessive mechanical failure and consequent excessive blockage of the pneumatic tube. When a carrier, which typically weighs several pounds, strikes a flap seal while traveling at a speed of from 30 to 40 feet per second, the flap seal is kicked open with a tremendous impact force. This great impact force results in metal fatigue and rather rapid wearing of both the valve and the carrier with consequent frequent malfunctioning of these commercially available valves. Further, the single flap design forces the carrier to one side of the valve which results in additional valve and carrier wear. Also, air intake in the commercially available flapper valves is often directly from the surrounding air. Thus moisture can be drawn into the line from the atmosphere in the form of rain, snow or steam. At subfreezing temperatures ice is formed and tube blockage sometimes results.

SUMMARY OF THE INVENTION

In accordance with a preferred embodiment, an improved valve design is disclosed herein for separating adjacent pneumatic tube sections of a pneumatic tube delivery system. The valve includes two short flap seals positioned on opposite sides of a carrier traveling through the valve. The use of two flap seals instead of the usual one flap seal results in each seal being lighter and shorter. The lighter and shorter flap seal is easier to displace by the carrier, and subjects each flap seal to less metal fatigue caused by sudden flexing at the time of carrier impact. Also, two flap seals result in a self-centering action on the carrier which reduces both valve and carrier wear. Also, in the preferred embodiment, each flap seal is spring biased closed and is allowed to swing through a substantial arc before encountering a shock absorbing element. The large arc allows the spring to absorb a significant amount of the flap seal's momentum before the shock absorber element completely stops the seal. This design results in substantially less battering and consequently less metal fatigue of each flap seal. Further, in the preferred embodiment the valve housing completely encloses the valve mechanism and provides a circular air intake which permits the air supply for the next tube section to be piped from a point free of steam, rain or snow, thereby avoiding possible icing in cold weather. Also, in the preferred embodiment each flap seal is faced with Teflon which provides a facing which is slippery, tough, resilient and chemically inert. The Teflon facing gives excellent performance over a long period of time.

DESCRIPTION OF A PREFERRED EMBODIMENT

Figure 1:
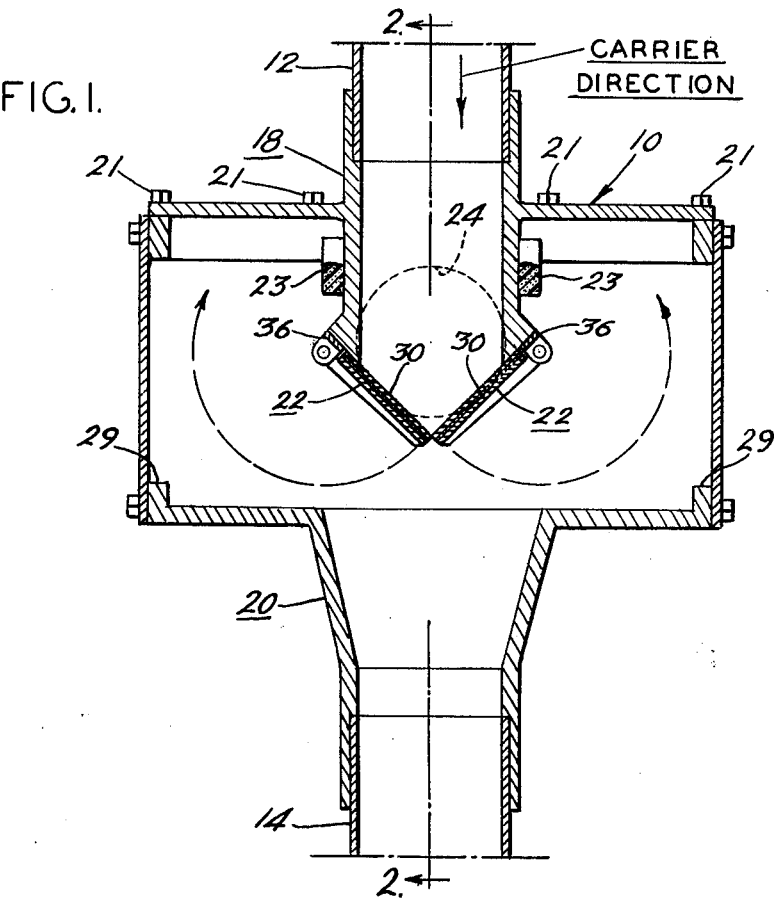
FIG. 1 illustrates a cross sectional view of one embodiment of the present invention.

Referring to FIG. 1, there is illustrated a cross sectional view of one embodiment of the present invention. A valve 10 separates and seals a first section of tubing 12 from a second section of tubing 14, each of which forms a portion of a pneumatic tube delivery system. The tubing section 12 is served by a first air flow source, and the tubing section 14 is served by a second and separate air flow source. In the preferred and illustrated embodiment these air flow sources would be vacuum sources, but in alternative embodiments pressure pumps might be utilized. Vacuum for the first section would be applied through a T immediately upstream of the tube section shown in FIG. 1. Vacuum for the second pneumatic section would be applied downstream of the valve. The valve 10 is normally closed to prevent the two vacuum sources from working against each other. The direction of carrier travel through the valve 10 is as indicated in FIG. 1.

Figure 2:
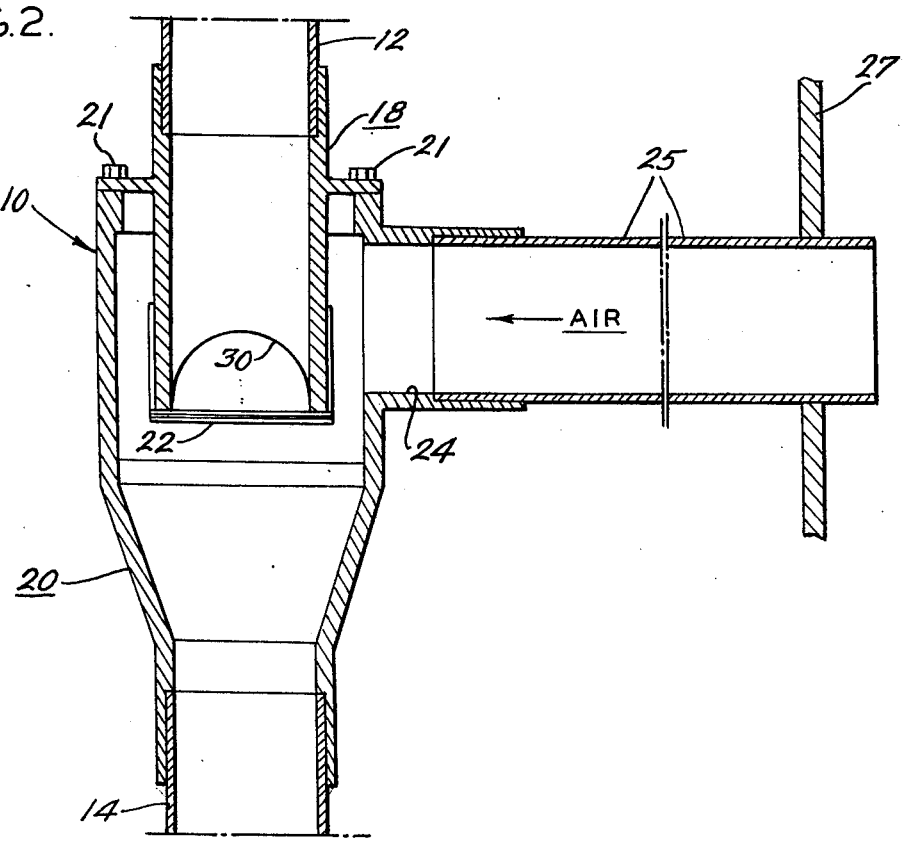
FIG. 2 illustrates a cross sectional view of the same embodiment taken at a 90° position relative to the view of FIG. 1.

As shown in FIGS. 1 and 2, the valve housing would normally be constructed in two sections, a first section 18 having a carrier entrance section and a second section 20 having a carrier exit section. The two sections are joined by any suitable means, as by bolts 21 which extend through section 18 into the top of section 20. Also, the housing should be provided with a pair of maintenance ports 29 to provide suitable access to the valve interior. As shown, the carrier exit section includes a tapered portion which allows for some offcenter movement of the carrier as it travels through the valve.

The valve includes a pair of flap seals 22 which are located on opposite sides of the entrance tube section. The flap seals close tightly against arcuate shaped seats 30, shown in FIG. 2, also positioned on opposite sides of the entrance tube section. The flap seals are normally closed by springs, shown in more detail in FIG. 3, and also by the action of the vacuum in the first section. The valve further includes a pair of shock absorber elements 23, which may be formed of a material such as foam plastic, and which are provided to completely stop the motion of each flap seal. As shown, each flap seal is allowed to swing through an arc of greater than 180° before encountering the shock absorber element 23.

Air for the second section is drawn into the valve housing through an air inlet section 24, shown in dashed lines in FIG. 1 and in cross section FIG. 2. By locating the air intake for the second section right in the valve, the coasting distance, during which the carrier is traveling without being under the influence of either vacuum section, is reduced to a rather short travel length. The air inlet section is provided with a pipe 25 which preferably runs to a point, such as the inside of an adjacent building 27, which is free from steam, rain and snow. This feature eliminates the problem of icing of the valve mechanism in freezing weather.

Figure 3:
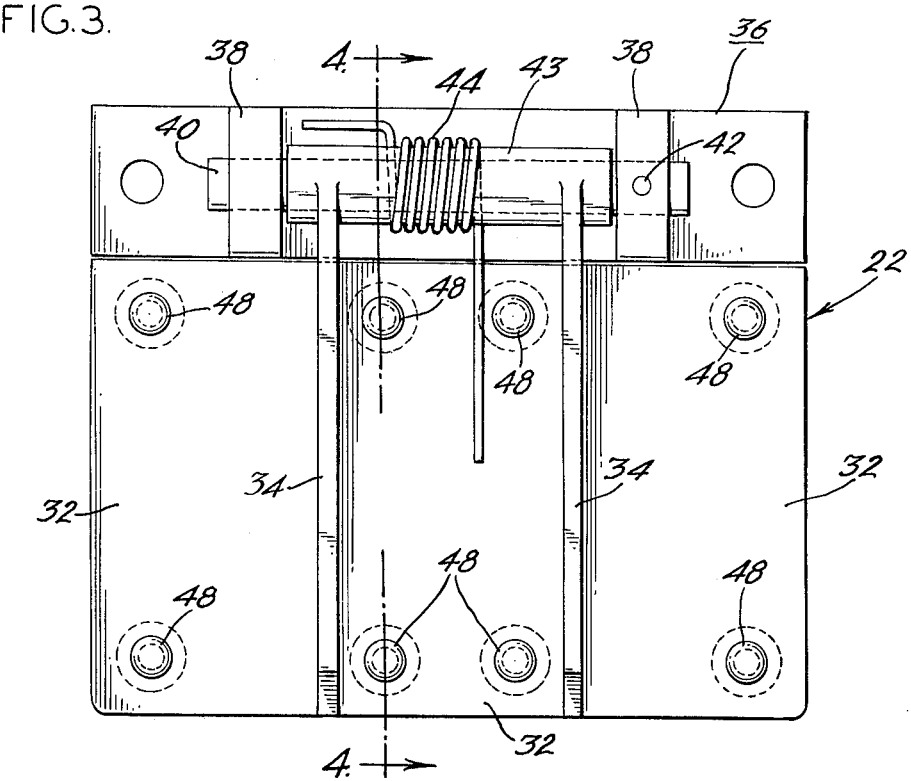
FIG. 3 shows the back of one of the flap seals.
Figure 4:
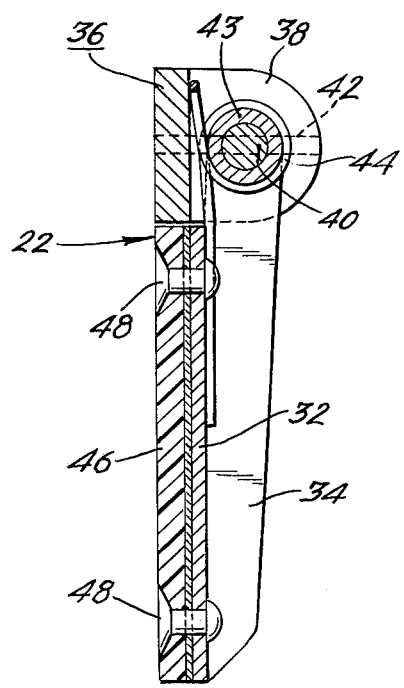
FIG. 4 illustrates a cross sectional view of the flap seal shown in FIG. 3.

FIG. 3 is a more detailed illustration of a flap seal. The back of the flap seal is illustrated, and includes a back support plate 32 and two support ribs 34, shown also in FIG. 4. The ribs 34 support the plate 32 for rotation and also serve to reinforce and strengthen the flap seal. The valve further includes a mounting section 36 which is attached directly to the valve inlet section 18 illustrated in FIG. 1. The mounting section 36 includes two raised sections 38 which support a shaft 40, about which the flap seal rotates. Shaft 40 may be held in place as by a shaft pin 42. The flap seal is attached by ribs 34 to a cylindrical shaped section 43 which pivots about shaft 40.

A spring 44 is also provided to bias the flap closed against the arcuate section 30 and also to slow down the flap seal after it has been kicked open by a carrier traveling through the valve. This is a significant design feature of the present invention as it should be remembered that each carrier typically might weigh several pounds, and is traveling through the pneumatic tube system at a speed of from 30 to 40 feet per second. Accordingly, the force generated upon impact of the carrier on the flap seal is a significant high impact force. By allowing the flap seal to travel through a long arc of greater than 180° before impacting on the shock absorber pad, the biasing spring 40 is given a rather long arc over which to decelerate the angular velocity of the flap seal before its impact upon the shock absorber. This gradual deceleration of the flap seal should result in less battering and metal fatigue of each flap seal and a significantly longer flap seal life.

Each flap seal has a layer of Teflon 46 held in place by a plurality of rivets 48 which are mounted below the surface of the Teflon. The Telfon provides a facing which is slippery, tough, resilient, chemically inert, and which should give excellent performance over a long life.

Although at least one embodiment of the present invention has been described, the teachings of this invention will suggest many other embodiments to those skilled in the art.

The invention claimed is:

1. In a pneumatic tube delivery system wherein adjacent pneumatic tube sections are serviced by separate air flow sources and wherein a valve must be provided to separate and seal the adjacent tube sections such that the air flow sources do not work against each other, an improved valve for separating and sealing adjacent tube sections and comprising:
   a. a valve housing;
   b. an entrance tube into said valve housing;
   c. said entrance tube having a pair of flap seals with each flap seal being located on an opposite side of said entrance tube;
   d. spring means for biasing each of said flap seals closed to seal the valve and also to absorb the shock encountered by each flap seal when a container traveling through the pneumatic tube delivery system kicks open the flap seals;
   e. said housing further having shock absorbing means positioned by each flap seal to encounter each flap seal after the flap seal has traveled through an arc of greater than 180°, such as if the flap seal is kicked open by a container and travels against the action of said spring means beyond a predetermined point it will encounter said shock absorbing means to stop the flap seal and whereby said arc of greater than 180° allows said spring mean a substantial arc to absorb the shock encountered by each flap seal; and
   f. an exit tube from said housing providing for the passage of a container from the valve.

2. Apparatus as set forth in claim 1 wherein said flap seals are inclined at an angle of approximately 45° to the direction of the container travel through the valve.

3. Apparatus as set forth in claim 1 wherein said housing has an air inlet section to provide air into an adjacent tube section, whereby the coasting distance during which the container is not being urged through the pneumatic tube delivery system by the flow of air through the system is kept to a relatively small distance.

4. Apparatus as set forth in claim 1 wherein each of said flap seals has a layer of Teflon material on it on the areas where the containers would impact on the flap seals.

* * * * *